United States Patent [19]

Kataoka

[11] 3,840,728

[45] Oct. 8, 1974

[54] MAGNETO-REACTANCE DEVICE

[75] Inventor: Shoei Kataoka, Tokyo, Japan

[73] Assignee: Agency of Industrial Science and Technology, Tokyo, Japan

[22] Filed: June 10, 1966

[21] Appl. No.: 556,600

[52] U.S. Cl. .............. 235/194, 307/309, 317/235 H

[51] Int. Cl. .......................... G06g 7/16, H01v 5/00

[58] Field of Search ...... 235/194, 194 HE; 307/251, 307/278, 279, 309; 317/235

[56] References Cited

FOREIGN PATENTS OR APPLICATIONS 883,338 11/1961 Great Britain ..................... 235/194

OTHER PUBLICATIONS

Berglund et al. – "A Hall Effect Multiplier For Pulsed Operation" – Journal of Scientific Instruments, pg. 751–754, 1964, Vol. 41.

Chasmar et al. — "An Electrical Multiplier Utilizing The Hall Effect In Indium Arsenide" – Electronic Engineering–pg. 661–664, 1958 (Nov.).

*Primary Examiner*—Joseph F. Ruggiero
*Attorney, Agent, or Firm*—Ernest G. Montague; Karl F. Ross; Herbert Dubno

[57] ABSTRACT

A magneto-reactance element comprising a semiconductor, a pair of current terminals at opposite ends thereof, and at least one reactive component at angles to the current path of the semi-conductor, and forming a circuit therewith, whereby a reactance is produced across the current terminals dependent upon a magnetic field and the value of the reactance varies according to the strength of the magnetic field.

15 Claims, 9 Drawing Figures

INVENTOR
Shoei Kataoka
BY Ernest F. Montague
Attorney

INVENTOR
Shoei Kataoka
BY
Ernest G. Montague
Attorney

MAGNETO-REACTANCE DEVICE

The present invention relates to a magneto-reactance device, in general, and to a device wherein multiplication and analogue computation of electrical quantities are achieved by utilizing magneto-reactance elements which preferably are made of a semiconductor having a high Hall constant and a high mobility, the impedance, particularly the reactance of which is produced and varied with an external magnetic field.

Heretofore, an element is known having a resistance which is variable with an external magnetic field. Further, a multiplier or an analogue computer utilizing a linear characteristic of a semiconductor having a magneto resistance is known. However, these devices and systems have disadvantages in that an electric power consumption in the element increases considerably due to the resistance increase of the element with the external magnetic field. Accordingly a large amount of electric current cannot be supplied and arithmetic operations to be performed by such computer are limited because of the difficulties in constructing the circuit due to four terminals of the element in the case of the Hall multiplier. The term "magneto-reactance" as used herein is a new term originated by the present inventor and means that a reactance is varied by a magnetic field. This term is derived from the term "magneto-resistance."

It is an object of the present invention to provide a magneto-reactance device which exhibits either type of reactance, inductive or capacitive and which overcomes the above disadvantages.

It is another object of the present invention to provide a magneto-reactance element comprising at least one semiconductor, a pair of current terminals disposed on the semiconductor and defining a current path and at least one reactance incorporated with the semiconductor at angles to the current path of the semiconductor, whereby a circuit is formed therewith and a reactance is produced across the current terminals dependent upon the strength of at least one magnetic field.

It is still another object of the present invention to provide multiplying, measuring and other computation devices utilizing this new magneto-reactance element of the present invention.

With the above and other objects in view which will become apparent in the following detailed description, the present invention will be clearly understood in connection with the accompanying drawings, in which.

Figure 3:
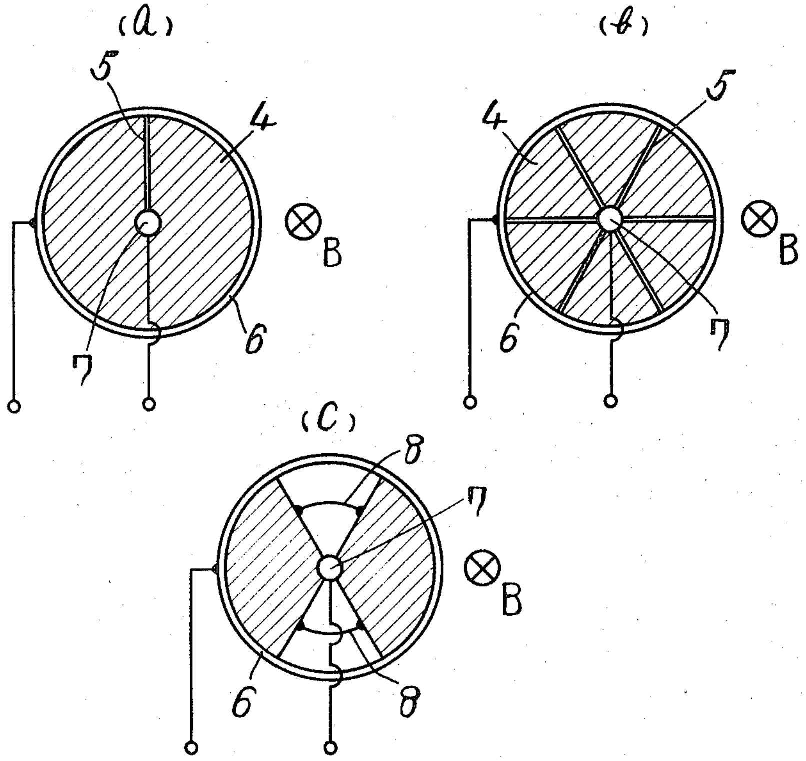
Figure 4:
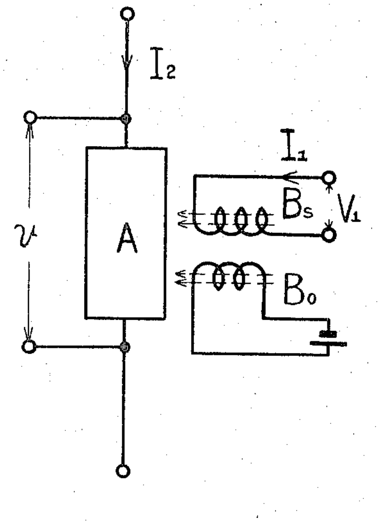
Figure 5:
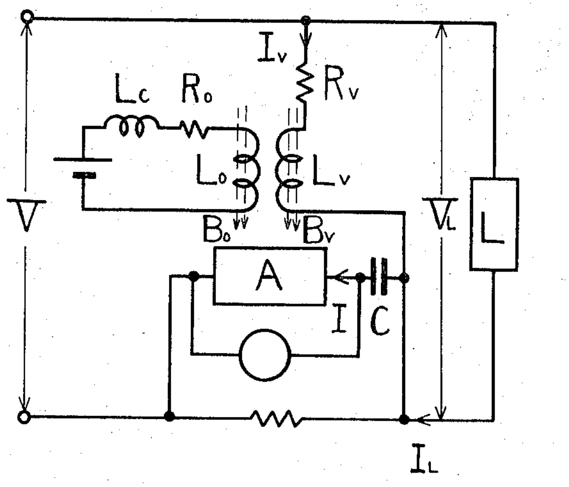
Figure 6:
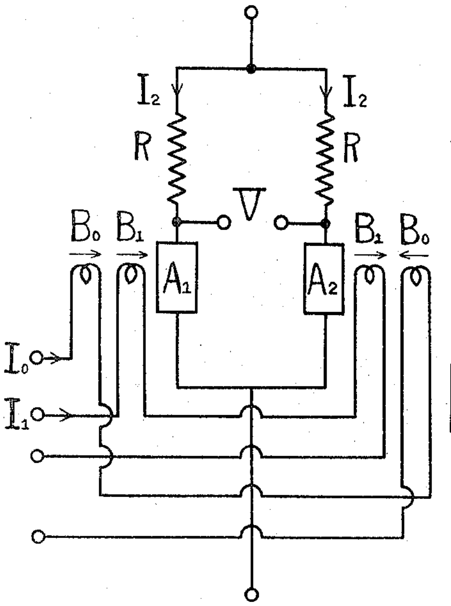

FIGS. 3(*a*), 3(*b*) and 3(*c*) are plan views of different embodiments of magneto-reactance elements;

FIG. 4 is a circuit diagram of a multiplying system which utilizes a magneto-reactance element of the present invention;

FIG. 5 is a circuit in which a multiplying operation with a magneto-reactance element is applied to an A.C. watt meter;

FIG. 6 is a circuit diagram of analogue computation system; and

Figure 7:
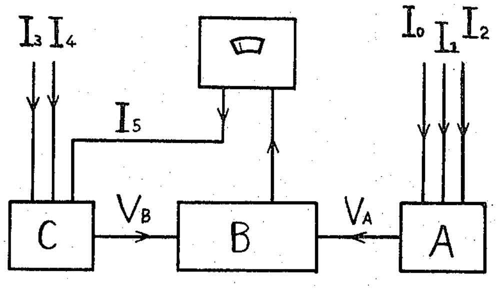

FIG. 7 is a circuit diagram of a 6-variable multiplier or divider.

Figure 1:
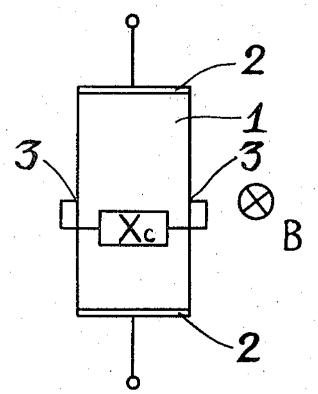
FIG. 1 illustrates a magneto-reactance element of the present invention.

Referring now to the drawings, and particularly to FIG. 1, preferably on both upper and bottom ends of a semiconductor element 1 preferably having a high mobility and a high Hall constant, current terminals 2 are provided and a reactance $X_c$ is connected, for example, between terminals 3 provided on both central portions of the side surfaces of the element 1. The semiconductor material preferably may be either *InSb* or *InAs*. The reactance $X_c$ may be either capacitive or inductive. This symbol $X_c$ represents the total effective reactance for the purposes of the mathematical analysis, and for simplicity in explanation, although not limited thereto, it is represented herein as one constant effective reactive component, which reactance in practice may be singular or plural and may be distributed to a certain extent (e.g. FIG. 3(*a*)).

An impedance across the terminals 2 of the element 1 is a resistance determined by the resistivity of the element and the shape thereof when no external magnetic field is applied.

If an external magnetic field B is applied vertically to the element 1, a Hall voltage will appear across the terminals 3 and then a Hall current will flow through the reactance $X_c$.

However, due to the reactance $X_c$, the phase of this Hall current is shifted from that of the main current flowing between the terminals 2 of the element 1.

Since the Hall current flows transversely within the element 1, a secondary Hall voltage will appear across terminals 2 due to the interaction between the primary Hall current and the magnetic field B. The secondary Hall voltage will, now, be added to the original voltage of the element 1 resulting in an increase of the voltage between terminals 2 of the element 1. The voltage increment contains a reactive component because the phase of the secondary Hall voltage differs from that of the current flowing between the terminals 2 when an external magnetic field is applied.

Figure 2:
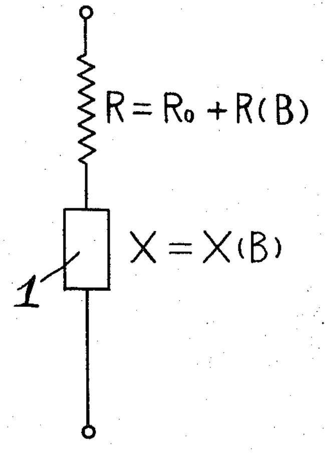
FIG. 2 is an equivalent circuit of the element of FIG. 1.

An equivalent circuit of element 1 is shown in FIG. 2. The impedance of the element 1 is represented by a sum of a resistance R and a reactance X where the resistance R is a sum of a resistance $R_o$ (for no magnetic field) and a resistance R(B) (which increases with an increase in the magnetic field) and the reactance X is represented by "reactance X(B)," which is produced by the external magnetic field.

Further, if the reactance $X_c$ connected between terminals 3 is negative, i.e., capacitive, the reactance X(B) appearing between terminals 2 on application of the external magnetic field B, will become positive, i.e., inductive, while if the reactance $X_c$ connected between terminals 3 is positive, i.e., inductive, the reactance X(B) will be negative, i.e., capacitive, the reactance appearing across the current terminals depending upon the strength of the magnetic field B. As capacitance can be relatively easily produced by using either a semiconductor or thin film techniques, etc., an inductive semiconductor element can be easily manufactured according to the present invention.

Referring now again to the drawings, and more particularly to FIGS. 3(*a*), 3((*b*) and 3(*c*), the magneto-impedance element of the present invention will be described.

FIG. 3(*a*) shows the present magneto-impedance element constructed in such a way that the Hall voltage to be generated within a Corbino disk 4 which is provided with a fine slit 5 acting as a distributed capacitor at high frequencies is short circuited through the capacitance only at high frequencies when the voltage is applied to the circumferential and center terminals 6 and 7 of the disk 4.

As shown in FIG. 3(*b*), an element provided with a disk 4 having a plurality of radial slits 5 may provide the same effect. The plurality of radial slits 5 serve as a plurality of capacitances, respecively. This element will have an inductance whose value is a function of the external magnetic field.

FIG. 3(*c*) shows another Corbino disk 4 which has been divided into two semi-circular sectors connected to each other through extremely fine metal lead wires (forming a plurality of inductances) 8. If the element is subjected to a vertical magnetic field, a capacitance will appear between the terminals 6 and 7 at high frequencies.

The reactance X of the magneto-impedance element increases in proportion to the double power of the magnetic field when the flux density is relatively small. However, the reactance X is increased linearly, due to a magneto-resistance effect in the element upon a relatively large magnetic flux density. Accordingly, the reactance increment $X_s$ of the element is in proportion to a signal magnetic flux density $B_s$, if a bias magnetic flux density $B_o$, which is above the value presenting the linear characteristics, together with a signal magnetic flux density $B_s$ is applied to the element.

As shown in FIG. 4, if a magneto-reactance element A is subjected to the magnetic flux density $B_o$ and the alternating signal magnetic flux density $\dot{B}_s$ produced by an alternating magnetizing current $\dot{I}_1$, an impedance $\dot{Z}$ of the element will be presented as $$\dot{Z} = R + j(X_o + \dot{X}_s) = R + j(X_o + K\dot{B}_s) = R + j(X_o + K_1\dot{I}_1) \quad (1)$$

where the symbol "·" over a letter indicates a complex vector and $\dot{X}_s = K\dot{B}_s = K_1\dot{I}_1$ and the resistance R is assumed to remain constant by neglecting the magneto-resistance effect.

Accordingly, a voltage across the element A upon which a current $\dot{I}_2$ passes will be represented as $$\dot{V} = \left\{R + j(X_o + K\dot{B}_s)\right\}\dot{I}_2 = \left\{R + j(X_o + K_i\dot{I}_1)\right\}\dot{I}_2 \quad (2)$$

A time-average of the voltage is proportional to a product of effective values of $\dot{I}_1$ and $\dot{I}_2$, when there is a 90° phase difference between $\dot{I}_1$ and $\dot{I}_2$, as given by $$\overline{V} = KB_sI_2 = K_1I_1I_2 \quad (3)$$

, and where $I_1$ and $I_2$ are the absolute values of $\dot{I}_1$ and $\dot{I}_2$, respectively. Further, in the case that $\dot{I}_1$ and $\dot{I}_2$ are not necessarily out of phase by 90°, a time-average voltage will be proportional to a reactive product of $\dot{I}_1$ and $\dot{I}_2$* as $$\overline{V} = K\text{Imag}\ [\dot{B}_s \times \dot{I}_2^*] = K_1\text{Imag}\ [\dot{I}_1 \times \dot{I}_2^*] \quad (4)$$

Where $\dot{I}_2^*$ is the conjugate of $\dot{I}_2$ and Imag means an imaginary part of the bracketed matter above. Now, if a magnetizing input voltage $\dot{V}_1$ and a magnetizing current $\dot{I}_1$ are out of phase by about 90°, a time-average voltage $\dot{V}$ of the element A becomes $$\overline{V} = K\text{Re}\ [\dot{V}_1^* \times \dot{I}_2^*]$$

which is proportional to an effective product of the voltage $\dot{V}_1$ and the current $\dot{I}_2$. Where Re is a real part of the bracketed matter above.

Although these are determined by the phase relation of the signal magnetic flux density $\dot{B}_s$ and the element current $\dot{I}_2$, and so the time-average voltage $\dot{V}$ of the element A is proportional to the reactive product of $\dot{B}_s$ and $\dot{I}_2$, it has been assumed in the above description that the phase of the magnetic flux density $\dot{B}_s$ is approximately equal to that of the current $\dot{I}_1$.

Referring now again to the drawings, FIG. 5 shows a circuit diagram in which the element A is utilized as an A.C. watt meter, where, the magnetizing current $I_v$, proportional to a load voltage $V_L$ applies a signal magnetic flux density $B_v$ to the element A and a current I proportional to a load current $I_L$ and leading in phase by 90° flows through the element A.

In the circuit, provisions are made to produce a phase difference of 90° between the phase of the voltage and the current of load L and the phase difference of the signal magnetic flux density $B_v$ and the element current I, by providing $L_c$ in the magnetizing circuit and C in the element circuit. By this means, the electric power consumed in the load can be observed through a time-average voltage generated across the opposite ends of the element A.

FIG. 6 shows a circuit including two magneto-reactance elements $A_1$ and $A_2$ each having identical characteristics and connected with a resistance R in series and arranged in parallel to each other.

The element $A_1$ is subjected to the sum of a magnetic flux density $B_o$ due to a current $I_o$ and a magnetic flux density $B_1$ due to a current $I_1$, while, the element $A_2$ is subjected to a difference in flux between the former and the latter. Now, if a current $I_2$ is sent through both elements, a difference of voltage appears across the respective opposite ends of these elements and can be represented by a product of the currents $I_o$, $I_1$ and $I_2$, and therefore, a multiplied result of these currents can be obtained from the voltage difference appearing between the output terminals. Suppose that $B_1 = K_1I_1$ and $B_o = K_oI_o$, a reactance $X_a$ fo the element $A_1$ becomes, $$X_a = K(B_1 + B_2)^2 = K(K_1I_1 + K_oI_o)^2 \quad (5)$$

while, a reactance $X_b$ of the element $A_2$ will be represented as $$X_b = K(B_1 - B_2)^2 = K(K_1I_1 - K_oI_o)^2 \quad (6)$$

In the case that resistances $R_o$ of the respective elements are the same and are not affected by the applied magnetic field, a voltage difference between the elements would be affected only by changes of the reactances as a function of the magnetic field, since the voltage drops since the resistances of both elements are the same.

Consequently, if the current $I_2$ is given to the both elements $A_1$ and $A_2$, the voltage difference will be given by equations (5) and (6) as, $$v = j(X_a - X_b)\, I_2 = 4jKK_iK_oI_oI_iI_2 \quad (7)$$

, and therefore, the voltage difference will be a product of $I_c$, $I_1$ and $I_2$. In this case, the voltage V is different in phase from that of the current $I_2$ by 90°.

As shown in FIG. 7, if a differential amplifier B is combined with two identical multiplying devices A and C based on the above mentioned principle, various kinds of multiplication and/or division computation of 6-variables such as currents $I_0$, $I_1$, $I_2$, $I_3$, $I_4$ and $I_5$ can be achieved.

As apparent from the above explanation, in accordance with the present invention, a novel multiplication computing device comprising an element or elements of which reactance varies, for example, in proportion to a double power of an applied magnetic flux density when it is relatively small and linearly for larger mangnetic flux density, is provided, and with this device various kinds of measurement, control or computation can be achieved.

In addition, the present invention further provides many advantages such as a minimized power loss, compactness of the device, simplicity of circuit construction, multiplicity of types of computation and the like.

Herein in the claims "at angles to the current path" includes perpendicular as well as at any other crossing angle. The current path in the illustrated embodiments of FIGS. 3(*a*) and 3(*b*) is distributed radially between the inner current terminal and the outer circumferential terminal; in this embodiment the radial slits form capacitances crossing at angles to the radial path of the current.

Prior to the present invention there has been no element for generating reactance by the operation of a semiconductor nor an element for controlling reactance by a magnetic field, nor a techniuqe for generating inductance by using a semiconductor. This fact has given rise to special difficulties in the development of present integrated circuits, etc.

While I have disclosed embodiments of the present invention, it is to be understood that these embodiments are given by example only, and not in a limiting sense.

I claim:

1. A magneto-reactance element comprising
at least one semiconductor,
a pair of current terminals defining a current path and disposed on said semiconductor, and
at least one reactance incorporated with said semiconductor at angles to said current path of said semiconductor, whereby a circuit is formed therewith and a reactance is produced across said current terminals dependent upon the strength of at least one magnetic field.

2. A multiplying device, comprising
at least one magneto-reactance element comprising a semiconductor, a pair of current terminals defining a current path and disposed on said semiconductor, and at least one reactance incorporated with said semiconductor at angles to said current path of said semiconductor whereby a circuit is formed,
means for applying a first magnetic biasing field to said semiconductor, and
means for applying a second magnetic field produced by an alternating magnetizing electric current to said semiconductor, whereby a direct current voltage is produced across said current terminals, said direct current voltage being proportional to the reactive product of said alternating magnetizing electric current and an electric current flowing through said semiconductor.

3. A multiplying device, comprising
a magneto-reactance element comprising at least one semiconductor, a pair of current terminals defining a current path disposed on said semiconductor and at least one reactance incorporated with said semiconductor at angles to said current path of said semiconductor whereby a circuit is formed therewith,
means for applying a first magnetic biasing field to said semiconductor,
means for applying to said semiconductor a second magnetic field produced by an alternating magnetizing electric current which is proportional to a load voltage, and
an additional reactance connected in series to one of said terminals, whereby a direct current voltage is produced across said current terminals, said direct current voltage being proportional to the effective product of said load voltage and a current flowing through the load.

4. A multiplying device, comprising
a pair of magneto-reactance elements, each of which comprises at least one semiconductor, a pair of current terminals defining a current path and disposed on said semiconductor, and at least one reactance incorporated with said semiconductor at angles to said current path of said semiconductor whereby a circuit is formed therewith,
a resistance connected in series with one of each of said pairs of current terminals,
said resistances connected to each other,
the other of each said pairs of current terminals connected with each other,
means for applying to one of said at least one semiconductor a sum field comprising the sum of a biasing magnetic field and a signal magnetic field, and
means for applying to the other of said at least one semiconductor a difference field comprising the difference between said biasing magnetic field and said signal magnetic field, whereby a voltage is produced across said one of each of said pairs of current terminals, said voltage being proportional to a three component product of the electric current for producing said biasing magnetic field, the electric current for producing said signal magnetic field and a total electric current flowing through said at least one semiconductor of both of said pair of magneto-reactance elements.

5. A multiplying device, comprising
at least one magneto-reactance element comprising at least one semiconductor, a pair of current terminals defining a current path and disposed on said semiconductor, and at least one reactance incorporated with said semiconductor at angles to said current path of said semiconductor whereby a circuit is formed therewith, means for applying a first magnetic biasing field produced by a direct current to said semiconductor, and means for applying a second magnetic field produced by an alternating magnetizing electric current to said semiconductor, whereby a direct current voltage is produced across said current terminals, said direct current voltage being proportional to the reactive product of said alternating magnetizing electric current and an electric current flowing through said semiconductor.

6. A multiplying device, comprising at least one magneto-reactance element comprising at least one semi-conductor, a pair of current terminals defining a current path and disposed on said semiconductor, and at least one reactance incorporated with said semiconductor at angles to said current path of said semiconductor whereby a circuit is formed therewith, means for applying a first biasing magnetic field to said semiconductor, and means for applying a second magnetic field produced by an alternating magnetizing electric current to said semiconductor, and an additional reactance connected in series to one of said current terminals, whereby a direct current voltage is produced across said current terminals, said direct current voltage being proportional to a reactive product of said alternating magnetizing electric current and an electric current flowing through said semiconductor.

7. The element, as set forth in claim 1, wherein said semiconductor has a high mobility.

8. The element, as set forth in claim 1, wherein said reactance is oriented perpendicular to said current path.

9. The element, as set forth in claim 1, wherein said reactance is capacitive.

10. The element, as set forth in claim 1, wherein said reactance is inductive.

11. The element, as set forth in claim 1, wherein one current terminal is the outer periphery of said semiconductor.

12. The element, as set forth in claim 11, wherein said semiconductor has a disc shape, and the other of said current terminals is disposed at the center of said disc.

13. The element, as set forth in claim 1, wherein said reactance is formed at least in part by at least one slit.

14. A solid state inductance device comprising a body of semiconducting material having a high carrier mobility, two spaced-apart current-supply terminals connected to said body and defining a current axis, said terminals also serving as means for connecting said device into a micro-circuit, two spaced Hall electrodes connected to said body and defining a Hall voltage axis between said terminals at right angles to said current axis, and an impedance which is capacitive only connected across said Hall electrodes, said device being adapted for use with means providing a magnetic field having a component at right angles to said current axis and to said Hall voltage axis.

15. A device according to claim 17, in which said body is a thin rectangular shaped plate.

* * * * *

PO-1050
(5/69)

UNITED STATES PATENT OFFICE
CERTIFICATE OF CORRECTION

Patent No. 3,840,728 Dated 8 October 1974

Inventor(s) Shoei KATAOKA

It is certified that error appears in the above-identified patent and that said Letters Patent are hereby corrected as shown below:

In the heading, after line [21] read:

-- [30] Foreign Application Priority Data:
14 June 1965 Japan.......40-34948 --

Signed and sealed this 11th day of February 1975.

(SEAL)
Attest:

RUTH C. MASON
Attesting Officer

C. MARSHALL DANN
Commissioner of Patents
and Trademarks